Feb. 24, 1970 H. W. LENSNER ET AL 3,497,772
PILOT WIRE PROTECTIVE ARRANGEMENT FOR ALTERNATING
CURRENT SYSTEM WHEREIN RELAY OPERATING AND
RESTRAINT SIGNALS ARE DERIVED DURING
HALF CYCLES OF OPPOSITE POLARITIES
Filed Jan. 18, 1967

WITNESSES:
Bernard R. Giguere
James F. Young

INVENTORS
Herbert W. Lensner and
John E. Hagberg.
BY
ATTORNEY

United States Patent Office 3,497,772
Patented Feb. 24, 1970

3,497,772
PILOT WIRE PROTECTIVE ARRANGEMENT FOR ALTERNATING CURRENT SYSTEM WHEREIN RELAY OPERATING AND RESTRAINT SIGNALS ARE DERIVED DURING HALF CYCLES OF OPPOSITE POLARITIES
Herbert W. Lensner, East Orange, and John E. Hagberg, Mountain Lakes, N.J., assignors to Westinghouse Electric Corporation, Pittsburgh, Pa., a corporation of Pennsylvania
Filed Jan. 18, 1967, Ser. No. 610,049
Int. Cl. H02h 3/28, 7/26, 7/00
U.S. Cl. 317—28    18 Claims

ABSTRACT OF THE DISCLOSURE

A pilot wire circuit connects two relay stations to protect an alternating current system. A relay at each station is responsive to alternate half-cycle pulses derived from the protected system. Pulses during the remaining half cycles are applied to the respective ends of the pilot wire circuit. During an external fault, the latter pulses restrain the relays. During an internal fault the latter pulses at the two stations oppose each other and substantially no restraining current flows.

---

Our invention relates to system for the protection of alternating current circuits and in particular relates to relay systems employing pilot-wires for protecting such alternating current circuits from faults.

In accordance with the invention, first and second alternating voltages are compared for the purpose of controlling the operation of a translating device. The operation of the translating device may be employed for any suitable purpose such as, the tripping of a circuit breaker.

For the purpose of operating the translating device, the device is supplied with a first operating energization dependent on pulses of one polarity of the first alternating voltage. Operation of the translating device is restrained by a restraining energization derived from pulses of the second alternating voltage of a predetermined polarity. Because of these energizations, the translating device is dependent on the phase relationship between the first and second alternating voltages.

The invention is particularly suitable for pilot-wire relaying employed for isolating a faulty section of an electric system. The pilot-wire relay is designed to discriminate between a fault occurring in the protected section of the electric system and a fault occurring external to the section. Examples of such relaying are found in the Edwin L. Harder Patent 2,183,646 and in the Myron A. Bostwick et al. Patent 2,303,429. Relaying systems of the type disclosed in these patents are known commercially as type HCB relaying systems.

As applied to pilot-wire relaying of the aforesaid type, our invention relates to circuits and adjunctive apparatus adapted to protect against false operations due to voltages induced in the pilot-wires by neighboring lines. Our invention also permits the utilization of pilot-wires of increased resistance and increases the phase shift tolerances between the first and second voltages present at spaced relaying stations during external faults. Our invention also minimizes or eliminates improper operation which has been encountered in prior art pilot-wire relaying systems due to the presence of residual magnetism in relays which were previously employed. Further desirable features of our pilot-wire relaying arrangement are noted below.

One object of our invention is accordingly, to provide an improved pilot-wire relaying system for protecting an alternating current system from the effects of faults occurring thereon.

Another object is to provide a pilot-wire relaying system which will be free from many types of objectionable characteristics which have been encountered in prior pilot-wire relaying systems.

Another object is to provide a pilot-wire relaying system which can operate with pilot-wires of greater electrical resistance.

Another object is to provide pilot-wire circuitry which shall be practically free from improper operation resulting from the induction of extraneous voltages by outside circuits.

Still another object is to provide a pilot-wire relaying system which, during external faults, shall be less affected by phase differences between control voltages at opposite ends of the line section protected.

Other objects of our invention will become apparent upon reading the following description taken in conjunction with the drawings in which.

The invention will be described as applied to a three-phase alternating-current electric system operating at a power frequency such as 60 cycles per second. This system includes a three-phase transmission line having a section 1 which extends between two spaced relaying stations S1 and S2. The section 1 has phase conductors LA, LB, and LC.

Figure 1:
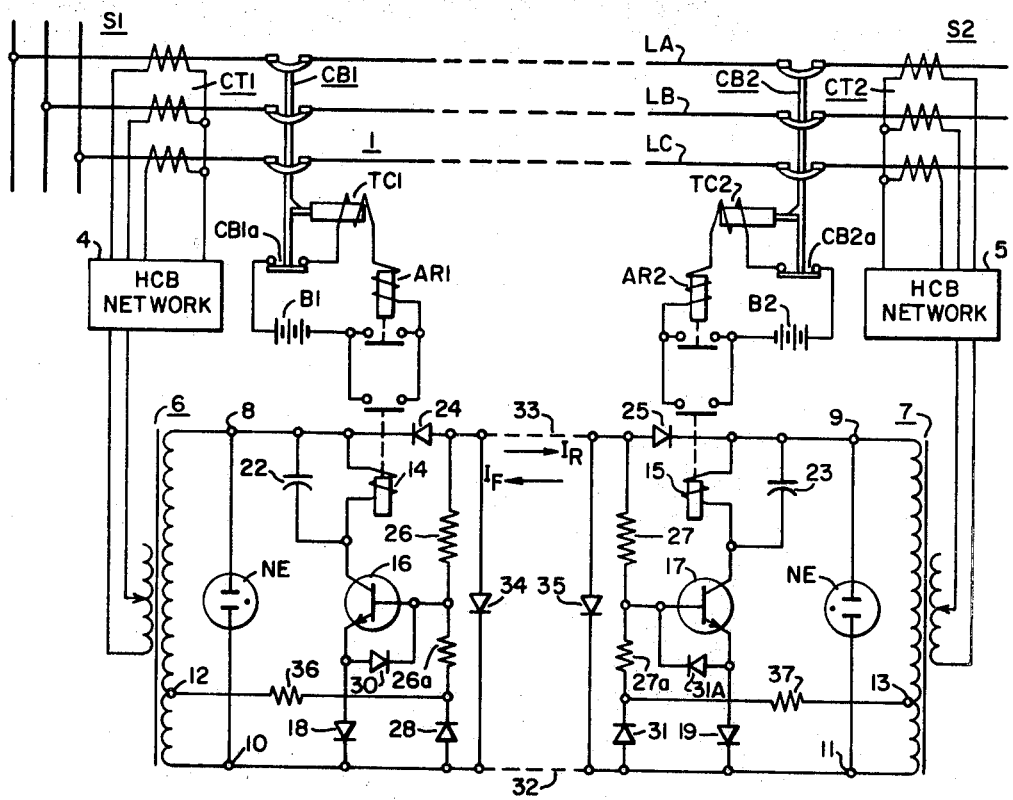
FIGURE 1 is a schematic diagram of one circuit embodying our invention.

By inspection of FIG. 1, it will be noted that the section 1 may be isolated from the remainder of the electric system by operation of circuit breakers CB1 and CB2 located respectively at the relaying stations S1 and S2. The circuit breaker, CB1 includes a trip coil TC1 and an auxiliary switch CB1a which is closed when the circuit breaker is closed and which is open when the circuit breaker is open. The circuit breaker CB2 similarly includes a tripping coil TC2 and an auxiliary switch CB2a.

At the relaying station S1, current transformers CT1 are employed for supplying the three-phase currents to a network 4. This network is designed to provide a single-phase alternating output voltage which is dependent on a characteristic of the currents supplied to the protected transmission line section. In the preferred embodiment of FIG. 1, the output of the network 4 is a single-phase alternating voltage representing the sum of the positive sequence symmetrical component and the zero sequence symmetrical component of the poly-phase currents flowing in the line section 1. Networks of this type are discussed in the aforesaid Harder patent.

The single-phase output of the network 4 is impressed on the adjustable primary of a transformer 6 which may be of a saturating core type. This transformer has its secondary shunted by a gaseous discharge tube NE of a neon lamp type which aids in saturating the associated transformer and facilities operation over a wide range of fault currents. Such a gaseous discharge tube is well known in the art for this purpose. The secondary has terminals 8 and 10 and a tap 12. A first alternating voltage appears between the terminals 8 and 10 which may be employed for relaying purposes.

In a similar manner current transformers CT2 supply inputs to a network 5 at the relaying station S2. The output of the network 5 is supplied to the adjustable primary of a transformer 7. The transformer 7 is similar to the transformer 6 and has a gaseous discharge tube NE connected across its secondary terminals 9 and 11 for the purpose discussed with reference to the transformer 6. A tap 13 is provided on the secondary of the transformer 7. A second alternating voltage appears between the terminals 9 and 11 and this voltage may be employed for relaying purposes.

At the relaying station S1, a control device 16 is provided which has a load circuit controlled by a control circuit. Conveniently, the control device may take the form of an NPN transistor having load terminals represented by its collector and emitter and having control circuit terminals represented by its base and emitter. At the same station, a translating device is provided which conveniently may take the form of a simple solenoid relay 14 having contacts which are open when the relay is deenergized and dropped out and which are closed when the relay is energized and picked up.

The operating coil of the relay 14, the load terminals of the transistor 16 and a rectifier 18 are connected in series in a branch circuit across the terminals 8 and 10 of the secondary of the transformer 6. The circuit may be traced from the terminal 8 to the coil of the relay 14, the collector and emitter of the transistor 16 and the anode and the cathode of the rectifier 18 to the terminal 10. A capacitor 22 spans the coil of the relay 14 to mitigate chattering of the relay contacts which might otherwise occur when the coil is traversed by intermittent current pulses.

When the relay 14 picks up, it completes a circuit which includes, in series, a source of voltage such as a battery B1, the auxiliary switch CB1a, the trip coil TC1, and the operating coil of an auxiliary relay AR1. When the auxiliary relay AR1 picks up, it establishes a holding circuit across the contacts of the relay 14. When energized in this manner, the trip coil TC1, trips the circuit breaker CB1. When the circuit breaker opens, the auxiliary switch CB1a opens to deenergize the trip coil TC1 and the auxiliary relay AR1.

In a similar manner, a branch circuit across the terminals 9 and 11 of the secondary of the transformer 7 at the relaying station S2 includes a relay 15, a transistor 17, and a rectifier 19. The relay 15 is spanned by a capacitor 23. Also, in a similar manner, the relay 15 cooperates with a battery B2 and an auxiliary AR2 for the purpose of controlling the energization of the trip coil TC2 of the circuit breaker CB2.

When the tap 12 of the transformer 6 is positive with respect to the terminal 10, a current flows through the control circuit of the transistor 16 which tends to turn this transistor on. The path of the current may be traced from the tap 12 through a resistor 36, a second resistor 26a, the base and the emitter of the transistor 16 and the rectifier 18 to the terminal 10. When the transistor 16 is turned on, an operating current flows from the terminal 8, which is positive with respect to the terminal 10 at this time, through the operating coil of the relay 14, the load circuit of the transistor 16 and the rectifier 18 to the terminal 10. A rectifier 30 is connected across the emitter and base of the transistor 16 and is poled to provide a low resistance path for current when the emitter is positive with respect to the base. This prevents the application of injurious back voltages across the emitter is positive with respect to the base. This prevents The transistor 17 similarly is biased to its on condition by a current flowing through a circuit which may be traced from the tap 13 (when this tap is positive relative to the terminal 11) through a resistor 37, a second resistor 27a, the base and emitter of the transistor 17 and the rectifier 19 of the terminal 11. A protective rectifier 31A is connected across the emitter and base of the transistor 17.

Restraining currents are transmitted between the relaying stations S1 and S2 over pilot-wires 32 and 33 under certain conditions for restraining turn-on of the transistor 16 and 17 and for thus restraining operation of the relays 14 and 15. For example, when the terminal 10 of the secondary of the transformer 6 is positive with respect to the terminal 8, current flows, which may be traced from the terminal 10 through the pilot-wire 32, a second rectifier 31, the resistor 27a, the resistor 27, and a first rectifier 24 to the terminal 8. The rectifiers 24 and 31 are poled to permit free flow of such current. It will be recalled that the resistor 27a is located in the control circuit of the transistor 17. In flowing through this resistor 27a, the current $L_F$ produces a voltage drop which blocks turn-on of the transistor 17. Consequently, the current $I_F$ may be termed a restraining current operating to restrain operation of the relay 15.

In an analogous manner when the terminal 11 is positive relative to the terminal 9, restraining current $I_R$ flows, which may be traced from the terminal 11 through the pilot-wire 32, a rectifier 28, the resistor 26a, a resistor 26, the pilot-wire 33 and a first rectifier 25 to the terminal 9. The rectifiers 28 and 25 are poled to permit free flow of this current. This current may be termed a restraining current which restrains operation of the relay 14.

At the relaying station S1, a third rectifier 34 bridges the pilot-wires 32 and 33. The cathode of this rectifier is connected to the wire 32 whereas the anode of the rectifier is connected to the wire 33. In a similar manner, at the relaying station S2 a third rectifier 35 has its anode connected to the pilot-wire 33 and its cathode connected to the wire 32.

The mode of operation of the above-described system is believed to be substantially as follows. As long as the operating condition of the electric system which includes the protected section is normal, the networks 4 and 5 impress no substantial voltages on the transformers 6 and 7 and relays 14 and 15 are not actuated. Should a fault develop on the three-phase electric system, for example a short circuit between two of the phase conductors or a grounding of one or more of the phase conductors, such as to produce a substantial quantity representing the sum of positive-sequence and zero-sequence symmetrical components, the relay networks 4 and 5 will each impress a single phase voltage on its associated transformer 6 or 7. If the fault lies between the relay stations S1 and S2 the polarity of the voltages impressed on the transformers 6 and 7 will make the terminals 8 and 9 simultaneously positive with respect to their associated terminals. When the fault lies outside the protected section, the terminal 8 is positive with respect to its associated terminal 10 when the terminal 9 is negative with respect to its associated terminal 11 and vice versa. Thus if the fault lies between the relay stations S1 and S2, when the secondary terminal 8 is positive relative to the terminal 10, a current pulse of substantial magnitude passes through the actuating coil of the relay 14, the load circuit of the transistor 16 and rectifier 18 to the secondary terminal 10 on the half-cycle of the voltage which produces such polarity conditions. In a similar manner, a current pulse will pass from the secondary terminal 9 of the transformer 7 through the actuating coil of the relay 15; however, no current can pass through the first rectifiers 24 and 25 from the transformers 6 and 7, respectively on such half-cycle of voltage since these rectifiers are poled to prevent such current flow. The transistors 16 and 17 are rendered highly conductive to the currents just described for the reasons that the taps 12 and 13 have polarities relative to their associated terminals 10 and 11, respectively which assure turn-on of the transistors 16 and 17. On the succeeding half-cycle, when the secondary terminals 8 and 9 are simultaneously negative relative to their associated terminals 10 and 11, respectively, no current can flow through the actuating coils of the relays 14 and 15 because the transistors 16 and 17 are in nonconductive conditions.

The net result is that if a fault is present between the relay stations S1 and S2, a succession of current pulses, one per cycle, will flow through the actuating coils of the relays 14 and 15. These relays operate to trip the associated circuit breakers CB1 and CB2 for the purpose of isolating the transmission line section located between the relay stations.

On the other hand, if the fault lies outside the section between the relay stations S1 and S2, the transformer terminal 9 is negative relative to its associated terminal 11 when the secondary terminal 8 is positive relative to its associated terminal 10. As a result, a first rectifier 25 adjacent the terminal 9 is now so poled that current can flow from the terminal 11 through a pilot-wire conductor 32, the second rectifier 28, the second resistor 26a, the first resistor 26, the pilot-wire conductor 33 and the first rectifier 25 to the secondary terminal 9. The third rectifiers 34 and 35 are poled to be nonconductive to current produced by the voltage across the secondary of the transformer 7 at this time.

A voltage drop produced by current flowing through the second resistor 26a is in the control circuit of the transistor 16 and maintains the transistor in its turned-off condition. The secondary of the transformer 6 at this time is ineffective to send current over the pilot-wire circuit or through the rectifier 24 because of the blocking action of the rectifier. The polarity of the voltage across the secondary of the transformer 7 at this time is such that it can direct no current through the rectifier 19 and the transistor 17 to pick up the relay 15.

The symmetry of the circuits fed by the transformers 6 and 7 insures that when either of the terminals 8 or 9 is negative when the other terminal is positive with respect to the associated terminals of the secondaries, both of the transistors 16 and 17 are nonconductive and no current pulses flow through either of the actuating coils of the relays 14 and 15. In other words, when a fault lies outside the line section between the relay stations S1 and S2, neither of the circuit breakers CB1 nor CB2 trips and the line section is not isolated from the rest of the alternating current system.

It is possible that an effect such as induction can produce a voltage across the pilot-wire circuit which makes the conductor 33 positive relative to the conductor 32. Such a voltage is shunted by the rectifiers 34 and 35 and consequently cannot produce a tripping operation of the circuit breakers CB1 and CB2. For voltages which make the conductor 32 positive relative to the conductor 33, the transistors 16 and 17 are nonconductive and the relays 14 and 15 do not operate.

While we have described the control devices 16 and 17 as NPN transistors, other devices such as PNP transistors which change from a conductive condition to a nonconductive condition under the control of control circuits may be substituted for the NPN transistors in ways which will be evident to those skilled in the electrical art. Also while we have described the relays 14 and 15 as mechanical relays, static devices such as silicon controlled rectifiers may be substituted for such relays, the substitution being well understood in the art.

Figure 2:
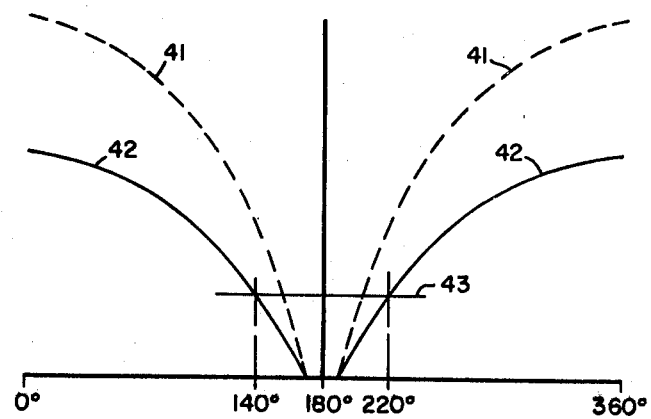
FIG. 2 is a graph used below in explaining our invention.

For a fault external to the line section 1, there will be no current in the transistor collector circuits when the fault currents at the two ends of the line section are 180° out of phase. This is shown in the graphical representation of FIG. 2 wherein ordinates represent current through one of the relays and abscissas represent the phase relationship of the line currents at the two relay stations. The dotted lines 41 in FIG. 2 represent the relay currents which may be obtained when the transformers 6 and 7 are saturated whereas the full line curves 42 in FIG. 2 represent the relay currents when the transformers operate below saturation. The relays 14 and 15 may be calibrated to pick up at current values which represent, for example, a 40° shift (plus or minus) from the 180° point. This pick up current is represented in FIG. 2 by the line 43. The phase displacements at which the relays 14 and 15 pick up depend, to some extent, on the fault currents as illustrated by the dotted lines 41 and full lines 42 which intersect the line 43 at different phase displacements. However, such variations are in a range that assures correct discrimination between internal and external faults. It will be noted that the invention permits selection of a minimum relay operating current which intersects the curves 42 at about 40° departure from phase opposition. This is a departure which is substantially greater than that which can occur in prior art pilot-wire relaying systems without tripping the circuit breakers.

Although the invention has been described with reference to certain specific embodiments thereof, numerous modifications falling within the spirit and scope of the invention are possible.

We claim as our invention:

1. In a protective relay station arrangement for an electric system having spaced relay stations adapted to be connected by an electric circuit, a pair of input terminals, a first one of said stations comprising a pair of connection terminals, a relay device operable from a first condition to a second condition, means responsive to presence of an alternating voltage across the input terminals for operably energizing the relay device during half-cycles of said alternating voltage of only a first polarity, means responsive to half-cycles only of a second polarity of the voltage across the input terminals for delivering to said connection terminals a voltage of unidirectional polarity, and means responsive to presence across said connecting terminals of a voltage of said unidirectional polarity during presence at the input terminals of said half-cycles of said alternating voltage of said first polarity for restraining operation of said relay device.

2. An arrangement as claimed in claim 1 in combination with a rectifier connected across said connection terminals and poled to block current flow therethrough by a voltage across the connection terminals of said unidirectional polarity.

3. An arrangement as claimed in claim 2 wherein a second one of said stations is similar to said first one of the stations, and a pilot-wire circuit interconnecting said connection terminals of said first and second ones of the stations.

4. In a protective relay arrangement for an electric system having first and second spaced relay stations, a circuit connecting the relay stations, means having input terminals at the first relay station and responsive to a first alternating voltage applied to said input terminals for transmitting a first unidirectional current in a first direction over the circuit, means having second input terminals located at the second relay station and responsive to an alternating voltage applied to the second input terminals for transmitting a second unidirectional current in a second direction over the circuit, first and second relay devices located respectively at the first and second relay stations, means for operating said first and second relay devices respectively in accordance with the first and second alternating voltages, and means for restraining operation of the first and second relay devices in accordance respectively with said second and first unidirectional currents.

5. An arrangement as claimed in claim 4 wherein said system is a polyphase electric system and said circuit is a pilot-wire circuit, said first and second named means developing first and second single-phase alternating voltages at the respective stations each dependent on a predetermined combination of the positive-sequence and zero-sequence symmetrical components of polyphase currents at the associated relay station, said first and second unidirectional currents being dependent on alternate half-cycles of the first and second single-phase alternating voltages respectively, said first unidirectional current being transmitted from the first to the second relay station and the second unidirectional current being transmitted from the second to the first relay station, and means responsive to operation of each of the relay devices for sectionalizing the polyphase electrical system adjacent the operated relay device.

6. An arrangement as claimed in claim 5, said relay-operating means being responsive to half-cycles other than said alternate half-cycles of the first alternating voltage for operating the first relay device and being responsive to half-cycles other than said alternate half-cycles of the second alternating voltage for operating the second relay device, said voltages being poled to bring the restraining pulses substantially into phase with the operating pulses for each relay device when power flows to a fault on the polyphase electric system located between the relay stations and substantially out of phase when the power in the polyphase electric system flows to a fault located on the same side of both of the relay stations.

7. An arrangement as claimed in claim 6 in combination with first and second rectfiers extending across the pilot-wire circuit respectively adjacent the first and second relay stations, each of said rectifiers being poled to block passage therethrough of the unidirectional currents.

8. A protective relay system for an alternating current system comprising a transformer having a primary adapted to draw energy from said circuits and a secondary having a tap point, a relay having an actuating winding with one terminal connected to the first terminal of said secondary winding and another terminal connected to a first load-terminal of a control-device which has a load-circuit and a control-circuit, a connection from the control-circuit of said control-device to the other terminal of said secondary, a connection from said first terminal of said secondary to the negative pole of a first rectifier, a connection from the plus pole of said first rectifier through a first-resistor to a second load-terminal of said control-device, a connection from said second load-terminal of said control-device through a second-resistor and a third-resistor to said tap-point, a connection from the junction of said second-resistor and said third-resistor to the negative pole of a second-rectifier which has its plus pole connected to said other terminal of said secondary, and a third-rectifier having its plus pole connected to the positive pole of said first rectifier and its negative pole connected to said other terminal of said secondary.

9. The arrangement described in claim 8 wherein an ancillary-rectifier is inserted to be nonconductive to current flow from said other terminal of said secondary to said control-circuit of said control-device.

10. The arrangement described in claim 9 wherein a fourth-rectifier is inserted to conduct current from said second load-terminal of said load-circuit to the plus pole of said ancillary-rectifier.

11. The arrangement described in claim 8 wherein said control-device is a transistor.

12. The arrangement described in claim 10 wherein said control-device is a transistor.

13. A protective arrangement for alternating current circuits comprising a first voltage source energized from said system and impressing voltage on a first branch comprising the actuating coil of a relay in series with a first load-terminal and a control-circuit of a control-device, a second branch comprising a first-rectifier and a second-rectifier and a first and second-resistor in series and poled to be nonconductive when said control-device makes its load-circuit conductive, a connection from the common-junction of said first and second-resistors to a second load-terminal of said control-device, a third-rectifier shunting said second-rectifier and said first and second-resistors and poled oppositely to said second-rectifier, and a second voltage source cophasal with said first voltage-source and connected to impress its voltage on said second-rectifier through a circuit of substantial impedance.

14. The arrangement described in claim 13 wherein an ancillary-rectifier is inserted in said first branch and so poled as to be conductive when said control device is conductive.

15. The arrangement described in claim 13 wherein said control-device is a transistor.

16. In combination with an alternating current system, a pair of protective devices each producing a voltage responsive to a system fault and comprising the arrangement described in claim 13 and respectively energized from said system at spaced points thereon, and a communication channel having its respective terminals connected in shunt to said third-rectifiers so that like poles of said third-rectifiers are directly interconnected.

17. In combination with an alternating current system, a pair of protective devices each producing a voltage responsive to a fault and comprising the arrangement described in claim 14 and respectively energized from said system at spaced points thereon, and a communication channel having its respective terminals connected in shunt to said third-rectifiers so that like poles of said third-rectifiers are directly interconnected.

18. In combination with alternating current system, a pair of relays each adapted to produce a substantial voltage upon occurrence of a fault on a portion of said system and spaced apart by a portion of said system to be protected, a transformer primary and attached circuit elements described in claim 8 deriving energy from each said relay, a first conductor connected between the plus poles of said two third-rectifiers, and a second conductor connected between the negative poles of said two third-rectifiers.

References Cited

UNITED STATES PATENTS

| | | | |
|---|---|---|---|
| 2,307,500 | 1/1943 | Geise | 317—28 |
| 2,696,573 | 12/1954 | Patrickson et al. | 317—29 X |
| 3,275,889 | 9/1966 | Sharp et al. | 317—27 X |
| 3,296,495 | 1/1967 | Paddison | 317—29 X |
| 3,340,435 | 9/1967 | Hoel | 317—27 X |

LEE T. HIX, Primary Examiner

J. D. TRAMMELL, Assistant Examiner

U.S. Cl. X.R.

317—29, 33